United States Patent Office.

ALICE MACDONALD, OF LONDON, ENGLAND.

PROCESS OF OBTAINING METALLIC LEAD AND WHITE-LEAD PIGMENTS FROM LEAD SULFIDES.

SPECIFICATION forming part of Letters Patent No. 544,584, dated August 13, 1895.

Application filed March 28, 1895. Serial No. 543,577. (No specimens.) Patented in England June 17, 1893, No. 11,972; in France March 30, 1894, No. 237,421; in Belgium July 18, 1894, No. 111,049; in Italy August 21, 1894, LXXII, 288; in New South Wales August 25, 1894, No. 5,276; in Tasmania August 27, 1894, No. 1,318; in Austria September 15, 1894, No. 44/4,895, and in Hungary December 4, 1894, No. 1,719.

*To all whom it may concern:*

Be it known that I, ALICE MACDONALD, a citizen of Scotland, residing at 13 Ladbroke Grove, Notting Hill, in the county of London, England, have invented a new and useful Process for Obtaining Metallic Lead and White-Lead Pigments from Lead Sulfides, (for which I have obtained patents in Great Britain, dated June 17, 1893, No. 11,972; in France, dated March 30, 1894, No. 237,421; in Italy, dated August 21, 1894, Vol. LXXII, 288; in Austria, dated September 15, 1894, No. 44/4,895; in Belgium, dated July 18, 1894, No. 111,049; in Hungary, dated December 4, 1894, No. 1,719; in New South Wales, dated August 25, 1894, No. 5,276, and in Tasmania, dated August 27, 1894, No. 1,318,) of which the following is a specification.

This invention relates to a treatment of lead sulphides whereby metallic lead and white lead pigment are obtained.

The process for this purpose is as follows: In a converter having basic lining molten lead sulphide PbS has air or oxygen blown gently through or over it, producing a reaction according to the formula $2PbS+O_2=PbS_2O_2+Pb$, whereby metallic lead Pb is separated and left in the converter, while a volatile compound $PbS_2O_2$, hitherto unknown, passes away as a vapor. As it passes away additional air or ogygen is blown into the vapor, converting it into a fume of nearly pure lead sulphate mixed with sulphur dioxide according to the formula $PbS_2O_2+O_4=PbSO_4+SO_2$. The sulphuric dioxide $SO_2$ may be used for manufacture of sulphuric acid. The lead sulphate $PbSO_4$ generally contains traces of unoxidized sulphide, which are objectionable in white pigment. They are got rid of in the following manner: The collected fume is placed in a reverberatory furnace or open retort and heated to a very dull red, whereby the traces of sulphide are oxidized, becoming converted into sulphate. The product is a very white pigment, which can be prepared in the usual way for painting purposes.

Having thus described the nature of my invention and the best means I know for carrying the same into effect, I claim—

The process described for the production of metallic lead and a white lead pigment from lead sulphide (PbS), said process consisting in the blowing air or ogygen over or through fused lead sulphide, it thereby producing a reaction expressed by the formula $2PbS+O_2=PbS_2O_2+Pb$, blowing additional air or oxygen into the volatile compound $PbS_2O_2$, and thereby converting it into a fume of nearly pure lead sulphate mixed with sulphur dioxide ($PbS_2O_2+O_4=PbSO_4+SO_2$), and finally heating lead sulphate, substantially as described.

In testimony whereof I have signed my name to this specification, in the presence of two subscribing witnesses, this 14th day of March, A. D. 1895.

ALICE MACDONALD.

Witnesses:
T. F. BARNES,
OLIVER IMRAY.